(12) United States Patent
Lee et al.

(10) Patent No.: US 10,221,307 B2
(45) Date of Patent: Mar. 5, 2019

(54) LOW GLOSS ASA-BASED RESIN COMPOSITION HAVING EXCELLENT WEATHERABILITY AND HEAT RESISTANCE

(71) Applicants: Hyundai Motor Company, Seoul (KR); Kia Motors Corporation, Seoul (KR)

(72) Inventors: Han Ki Lee, Whasung-Si (KR); Dae Sik Kim, Whasung-Si (KR); Hak Soo Kim, Whasung-Si (KR); Jang Hyun Choi, Whasung-Si (KR); Min Sung Kang, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 15/379,172

(22) Filed: Dec. 14, 2016

(65) Prior Publication Data
US 2018/0037730 A1  Feb. 8, 2018

(30) Foreign Application Priority Data

Aug. 4, 2016 (KR) .................. 10-2016-0099344

(51) Int. Cl.
| | | |
|---|---|---|
| C08L 51/04 | (2006.01) | |
| C08L 25/12 | (2006.01) | |
| C08K 3/34 | (2006.01) | |
| C08L 25/16 | (2006.01) | |
| C08L 55/02 | (2006.01) | |
| C08L 51/00 | (2006.01) | |

(52) U.S. Cl.
CPC ............... *C08L 25/12* (2013.01); *C08K 3/34* (2013.01); *C08L 25/16* (2013.01); *C08L 51/003* (2013.01); *C08L 51/04* (2013.01); *C08L 55/02* (2013.01); *C08L 2201/08* (2013.01); *C08L 2205/02* (2013.01); *C08L 2205/025* (2013.01); *C08L 2205/035* (2013.01); *C08L 2205/06* (2013.01); *C08L 2207/53* (2013.01)

(58) Field of Classification Search
CPC ......... C08L 51/04; C08L 51/003; C08L 25/12
See application file for complete search history.

(56) References Cited

FOREIGN PATENT DOCUMENTS

| CN | 101775178 | 7/2010 |
|---|---|---|
| JP | 2003-512496 | 4/2003 |
| KR | 10-2000-0055258 | 9/2000 |
| KR | 10-2003-0046055 A | 6/2003 |
| KR | 10-0915114 B1 | 9/2009 |
| KR | 10-0922700 B1 | 10/2009 |
| KR | 10-2010-0045830 | 5/2010 |
| KR | 10-2011-0076686 A | 7/2011 |
| KR | 10-1056314 | 8/2011 |
| KR | 10-1240322 | 3/2013 |
| KR | 10-2015-0066647 A | 6/2015 |
| KR | 10-2015-0069888 A | 6/2015 |
| KR | 10-2015-0072114 | 6/2015 |
| KR | 10-1543120 B1 | 8/2015 |
| WO | WO 2004/108823 A1 | 12/2004 |

*Primary Examiner* — Peter D. Mulcahy
(74) *Attorney, Agent, or Firm* — Morgan, Lewis & Bockius LLP

(57) ABSTRACT

A low gloss ASA-based resin composition having excellent weatherability and heat resistance is provided. The low gloss ASA-based resin composition is obtained by blending a general SAN copolymer, a heat-resistant SAN copolymer, a crosslinked aromatic vinyl compound-cyanide vinyl compound copolymer, and an amorphous inorganic material with large diameter and extra-large diameter ASA graft copolymers at a predetermined composition ratio. The low gloss ASA-based resin composition is useful in the manufacture of a high-quality molded article in which gloss characteristics are uniformly exhibited because impact resistance, heat resistance, flowability, weatherability, and low gloss characteristics are all excellent, and particularly, the gloss deviation on the entire surface of the injection molded article is significantly reduced.

9 Claims, 1 Drawing Sheet

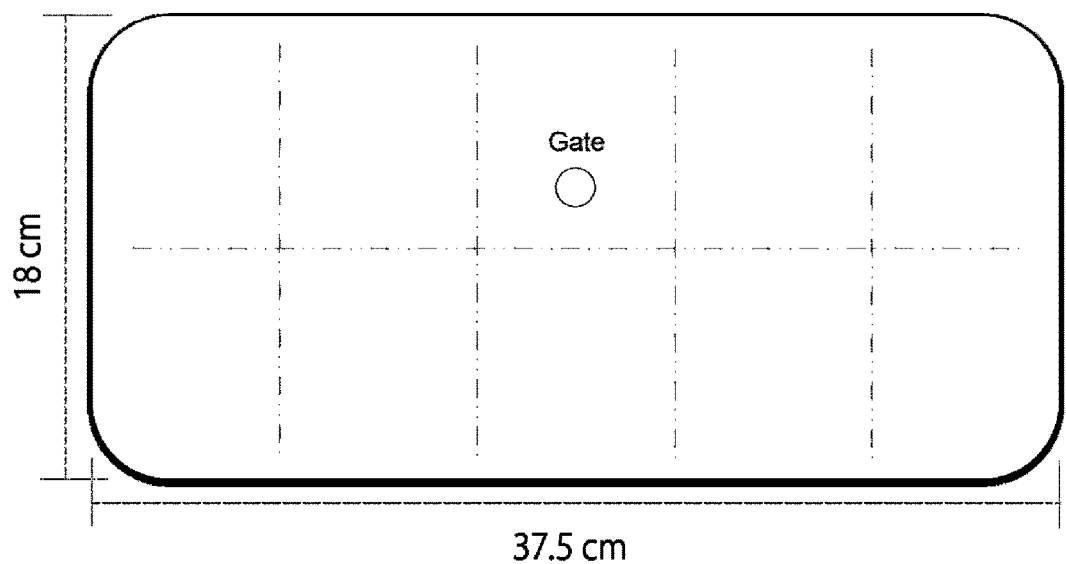

LOW GLOSS ASA-BASED RESIN COMPOSITION HAVING EXCELLENT WEATHERABILITY AND HEAT RESISTANCE

CROSS-REFERENCE TO RELATED APPLICATION

This application claims under 35 U.S.C. § 119(a) the benefit of Korean Patent Application No. 10-2016-0099344, filed on Aug. 4, 2016, the entire contents of which are incorporated herein by reference for all purposes.

BACKGROUND

Technical Field

The present disclosure relates to a low gloss ASA-based resin composition having excellent weatherability and heat resistance.

Background Art

In general, an acrylonitrile-butadiene-styrene (hereinafter, referred to as ABS) resin is applicable to various fields such as automobiles, electric and electronics, office appliances, home electronics products, toys, and stationery due to excellent impact resistance and excellent processability. And thus ABS has been widely used. However, the ABS resin is easily oxidized by oxygen, UV rays, light, and heat due to the double bond of butadiene rubber which is used as an impact modifier. ABS has very limited use as an exterior material due to color change of the outer shape of the resin and vulnerability which makes the appearance quality deteriorate. ABS resin fails to satisfy the needs of customers because of its discoloration, even as an interior material.

In contrast, an acrylonitrile-styrene-acrylate (hereinafter, referred to as ASA) resin which uses an acrylic rubber instead of butadiene can provide improved weatherability and chemical resistance which are the weakest points of the ABS resin. The physical properties and appearance of a product such as a molded article made of an ABS resin are not easily changed when used outdoors over a long period of time or when exposed to chemicals. Further, the ASA resin has an advantage in that it is possible to omit a painting process for improving weatherability and chemical resistance.

Recently, due to the high-end trend for home electronics products, automobile interior materials, and the like, interests have been concentrated on a sensitive resin which may express a non-painting, low gloss, and soft texture instead of a cold and artificial gloss. Recently, the high-end trend for home electronics products, automobile interior materials, and the like has created a tendency to omit a coating or painting process and directly use a low gloss resin due to the indoor air quality regulation and environmental problems encountered in the automobile industry.

As an applied method of manufacturing a low gloss resin, the following methods have been known.

There is a method of exhibiting low-light effects through the scattered reflection which scatters incident light by significantly adjusting the smoothness of the surface of a resin. Specifically, there is a method of manufacturing and using a resin by using extra-large diameter rubber particles with an average particle diameter of 1 μm or more. The gloss deviation on the entire surface of a molded article may be reduced by using only a resin thus manufactured. Also, the low gloss effect is minimal and the heat resistance is not high.

There is another method of exhibiting low-light effects on the surface of an injection product. This method includes subjecting the surface of a molded article to embossed treatment on a mold to impart unevenness to the surface. The product thus manufactured has excellent low-light effects, but a separate mold is needed for each shape of the product, and the gloss is partially increased without solving the gloss non-uniformity of the low gloss resin itself. The size of a molded article to which the low gloss resin is applied is increased. Accordingly, a gloss deviation occurs as the gloss is non-uniformly exhibited at a high quality level when the molded article is molded. To solve these problems, mold analysis such as adjusting the injection molding conditions and the mold gate position, and the like can be performed, but there are limitations.

Therefore, there is a need for developing a new low gloss thermoplastic material which is capable of uniformly exhibiting low gloss characteristics on the total surface area of a molded article while simultaneously having excellent weatherability, heat resistance, and low gloss characteristics.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a new thermoplastic resin composition which is capable of reducing the gloss deviation non-uniformly occurring on the surface of an injection product while having excellent weatherability, heat resistance, and low gloss characteristics.

In another aspect, the present invention provides a thermoplastic acrylonitrile-styrene-acrylate (ASA) resin composition, which has excellent heat resistance and low gloss deviation on the entire surface of a molded article.

The aforementioned and other objects of the present invention can be all achieved by the present invention which will be described below in detail.

In order to solve the aforementioned problem, a low gloss styrene-based resin composition according to the present invention comprises:

about 10 wt % to 40 wt % (e.g., about 10 wt %, 12, 14, 16, 18, 20, 22, 24, 26, 28, 30, 32, 34, 36, 38, or about 40 wt %) of an ASA graft copolymer including a large diameter acrylic-based rubber with an average particle diameter of about 3,000 Å to about 5,000 Å (e.g., about 3000 Å, 3100, 3200, 3300, 3400, 3500, 3600, 3700, 3800, 3900, 4000, 4100, 4200, 4300, 4400, 4500, 4600, 4700, 4800, 4900 or about 5000 Å) as a core;

about 1 wt % to about 20 wt % (e.g., about 1 wt %, 2, 3, 4, 5, 6, 7, 8, 9, 10, 11, 12, 13, 14, 15, 16, 17, 18, 19, or about 20 wt %) of an ASA graft copolymer including an extra-large diameter acrylic-based rubber with an average particle diameter of about 0.5 μm to about 1.5 μm (e.g., about 0.5 μm, 0.6, 0.7, 0.8, 0.9, 1.0, 1.1, 1.2, 1.3, 1.4, or about 1.5 μm) as a core;

about 20 wt % to about 60 wt % (e.g., about 20 wt %, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 or about 60 wt %) of an SAN copolymer;

about 10 wt % to about 40 wt % (e.g., about 10 wt %, 12, 14, 16, 18, 20, 22, 24, 26, 28, 30, 32, 34, 36, 38, or about 40 wt %) of a heat-resistant SAN copolymer;

about 1 wt % to about 10 wt % (e.g., about 1 wt %, 2, 3, 4, 5, 6, 7, 8, 9 or about 10 wt %) of a crosslinked aromatic vinyl compound-cyanide vinyl compound copolymer; and about 0.1 wt % to about 5 wt % (e.g., about 0.1 wt %, 0.3, 0.5, 0.7, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, or about 5 wt %) of an amorphous inorganic material.

The low gloss ASA-based resin composition of the present invention has a low degree of gloss while having excellent impact resistance, heat resistance, and weatherability and uniformly exhibits low gloss characteristics. The resin is useful as a material for a non-painting molded article, which may produce a luxurious atmosphere.

In particular, the low gloss ASA-based resin composition of the present invention is useful as a material for an automobile interior part.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein:

FIG. 1 is a plan view of a mold for evaluating a partial gloss deviation.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention will be described in detail as follows.

A low gloss ASA-based resin composition of the present invention has excellent impact resistance, heat resistance, flowability, weatherability, and low gloss characteristics. The resin composition has effects of reducing the gloss deviation occurring on the surface of an injection molded article because an SAN copolymer, a heat-resistant SAN copolymer, a crosslinked aromatic vinyl compound-cyanide vinyl compound copolymer, and an amorphous inorganic material are included in ASA graft copolymers with different average particle diameter ranges.

Hereinafter, each composition component constituting the low gloss ASA-based resin composition according to the present invention will be specifically described.

Large diameter ASA graft copolymer

The large diameter ASA graft copolymer used in the present invention is a material having a core-shell structure, in which an acrylic-based rubber is used as a core and vinyl-based monomers are graft-polymerized on the surface of the core to form a shell. Specifically, the ASA graft copolymer has a content ratio of from about 30 wt % to about 80 wt % (e.g., about 30 wt %, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or about 80 wt %) of the acrylic-based rubber constituting the core and 20 wt % to 70 wt % (e.g., about 20 wt %, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or about 70 wt %) of the vinyl-based graft copolymer constituting the shell. As a method of polymerizing the ASA graft copolymer, a typical method publicly known in the art may be used, and for example, emulsion polymerization, suspension polymerization, and the like may be used, and preferably an emulsion polymerization method may be used. In order to significantly increase the average particle diameter of the acrylic-based rubber constituting the core, an emulsion polymerization method may be more advantageously used.

The acrylic-based rubber constituting the core of the large diameter ASA graft copolymer may be prepared by cross-link-polymerizing alkyl acrylate monomers. The alkyl acrylate monomer is an acrylic-based or methacrylic-based compound in which an alkyl group having 1 to 10 carbon atoms is substituted, and specifically, it is possible to use one or a mixture of two or more selected from methyl acrylate, ethyl acrylate, propyl acrylate, butyl acrylate, 2-ethylhexyl acrylate, methyl methacrylate, ethyl methacrylate, propyl methacrylate, butyl methacrylate, and the like, and the monomer is not always limited thereto. As the alkyl acrylate monomer, butyl acrylate may be preferably used.

In the present invention, the average particle diameter of the acrylic-based rubber used to constitute the core of the large diameter ASA graft copolymer may be in a range of 3,000 to 5,000 Å (e.g., about 3000 Å, 3100, 3200, 3300, 3400, 3500, 3600, 3700, 3800, 3900, 4000, 4100, 4200, 4300, 4400, 4500, 4600, 4700, 4800, 4900 or about 5000 Å), and it is possible to obtain an effect of improving physical properties such as impact strength by limiting the average particle diameter to a range of preferably 3,500 to 4,000 Å (e.g., about 3500 Å, 3600, 3700, 3800, 3900, 4000 Å). Specifically, when the average particle diameter of the acrylic-based rubber constituting the large diameter ASA graft copolymer is decreased to less than 3,000 Å, impact resistance deteriorates, and the smoothness of the surface of the resin is enhanced, and as a result, when incident light is reflected out of the surface, the degree of scattering is decreased, and accordingly, the gloss may be increased. Meanwhile, when the average particle diameter of the acrylic-based rubber exceeds 5,000 Å, impact resistance is increased, but the difference in particle diameter between the acrylic-based rubber and the large diameter ASA graft resin is so minimal that the gloss may not be easily adjusted.

The shell of the large diameter ASA graft copolymer may be formed by graft copolymerization of an aromatic vinyl-based compound with a cyanide vinyl-based compound. In the constitution of the shell of the ASA graft copolymer, it is possible to copolymerize a content ratio of about 60 wt % to 80 wt % (e.g., about 60 wt %, 61, 62, 63, 64, 65, 66, 67, 68, 69, 70, 71, 72, 73, 74, 75, 76, 77, 78, 79, or about 80 wt %) of the aromatic vinyl compound and about 20 wt % to about 40 wt % (e.g., about 20 wt %, 21, 22, 23, 24, 25, 26, 27, 28, 29, 30, 31, 32, 33, 34, 35, 36, 37, 38, 39, or about 40 wt %) of the cyanide vinyl-based compound. In the aforementioned aromatic vinyl-based compound, it is possible to use one or a mixture of two or more selected from styrene, α-methyl styrene, p-methyl styrene, 2,4-dimethyl styrene, vinyl toluene, and the like, and the compound is not always limited thereto. The cyanide vinyl-based compound may include acrylonitrile, methacrylonitrile, ethacrylonitrile, and the like, and these may be used either alone or in mixture of two or more thereof.

In the low gloss ASA-based resin composition of the present invention, the large diameter ASA graft copolymer may be included in a range of 10 wt % to 40 wt % (e.g., about 10 wt %, 12, 14, 16, 18, 20, 22, 24, 26, 28, 30, 32, 34, 36, 38, or about 40 wt %). Preferably, when the large diameter ASA graft copolymer is included in a range of 30 wt % to 40 wt % (e.g., about 30 wt %, 31, 32, 33, 34, 35, 36, 37, 38, 39, or about 40 wt %), the balance of impact resistance, fluidity, and low gloss characteristics is advantageously maintained.

Extra-Large Diameter ASA Graft Copolymer

The extra-large diameter ASA graft copolymer used in the present invention is a material having a core-shell structure, in which an acrylic-based rubber is used as a core and vinyl-based monomers are graft-polymerized on the surface of the core to form a shell. Specifically, the ASA graft copolymer has a content ratio of about 30 wt % to 80 wt % (e.g., 30 wt %, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or about 80 wt %) of the acrylic-based rubber constituting the core and about 20 wt % to about 70 wt % (e.g., about 20 wt %, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, or about 70 wt %) of the vinyl-based graft copolymer constituting the shell. As a method of polymerizing the ASA graft copolymer, a typical method publicly known in the art may be used, and for example, emulsion polymerization, suspension polymerization, and the like may be used, and preferably an emulsion polymerization method may be used. In particular, in order to prepare an extra-large diameter acrylic-based rubber, an emulsion polymerization method may be more advantageously used.

The type and content ratio of acrylic-based rubber constituting the core of the extra-large diameter ASA graft copolymer and vinyl-based graft copolymer constituting the shell are the same as those already described in the large diameter ASA graft copolymer.

In order to prepare the extra-large diameter ASA graft copolymer in the present invention, the average particle diameter of the acrylic-based rubber may be in a range of about 0.5 μm to about 1.5 μm (e.g., about 0.5 μm, 0.6, 0.7, 0.8, 0.9, 1.0, 1.1, 1.2, 1.3, 1.4, or about 1.5 μm), and preferably, it is possible to obtain an effect of implementing desired low gloss characteristics by limiting the average particle diameter to a range of about 0.5 μm to 1.0 μm (e.g., about 0.5 μm, 0.6, 0.7, 0.8, 0.9, or about 1.0 μm) to lower impact strength and the smoothness of the surface of the resin. Specifically, when the average particle diameter of the acrylic-based rubber constituting the extra-large diameter ASA graft copolymer is decreased to less than 0.5 μm, it may be difficult to implement low gloss characteristics of the resin composition. In contrast, as the average particle diameter of the acrylic-based rubber is increased, effects of decreasing low gloss characteristics and the gloss deviation on the surface of the molded article may be increased, but it is difficult to prepare an acrylic-based rubber having an average particle diameter of more than 1.5 μm by a typical polymerization method. In the present invention, an acrylic-based rubber having a maximum average particle diameter of 1.5 μm may be prepared by using an emulsion polymerization method.

In the low gloss ASA-based resin composition of the present invention, the extra-large diameter ASA graft copolymer may be included in a range of 1 wt % to 20 wt % (e.g., about 1 wt %, 2, 3, 4, 5, 6, 7, 8, 9, 10, 11, 12, 13, 14, 15, 16, 17, 18, 19, or about 20 wt %). Preferably, when the extra-large diameter ASA graft copolymer is included in a range of 3 to 10 wt %, the balance of impact resistance, fluidity, and low gloss characteristics is advantageously maintained.

SAN Copolymer

The SAN copolymer of the present invention is a 2-membered copolymer composed of about 50 wt % to about 90 wt % (e.g., about 50 wt %, 52, 54, 56, 58, 60, 62, 64, 66, 68, 70, 72, 74, 76, 78, 80, 82, 84, 86, 88, 89, or about 90 wt %) of an aromaticvinyl-based monomer and about 10 wt % to about 50 wt % (e.g., about 10 wt %, 12, 14, 16, 18, 20, 22, 24, 26, 28, 30, 32, 34, 36, 38, 40, 42, 44, 46, 48, 49, or about 50 wt %) of a cyanide vinyl-based monomer, and the weight average molecular weight (Mw) is in a range of about 100,000 to about 200,000 (e.g., about 100,000, 125,000, 150,000, 175,000, or about 200,000). The SAN copolymer may be prepared by a method such as bulk polymerization, solution polymerization, emulsion polymerization, and suspension polymerization, which are typical polymerization methods. In the aforementioned aromatic vinyl-based monomer, it is possible to use one or a mixture of two or more selected from styrene, α-methyl styrene, p-methyl styrene, ethyl styrene, propyl styrene, butyl styrene, and the like, and the monomer is not always limited thereto. The aromatic vinyl-based monomer is preferably styrene. In the cyanide vinyl-based monomer, it is possible to use one or a mixture of two or more selected from acrylonitrile, methacrylonitrile, ethacrylonitrile, and the like, and the cyanide vinyl-based monomer is not always limited thereto. The cyanide vinyl-based monomer is preferably acrylonitrile.

In the low gloss ASA-based resin composition of the present invention, the SAN copolymer may be included in a range of from about 20 wt % to 60 wt % (e.g., about 20 wt %, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, or 60 wt %). Preferably, when the SAN copolymer is included in a range of from about 20 wt % to about 40 wt % (e.g., about 20 wt %, 21, 22, 23, 24, 25, 26, 27, 28, 29, 30, 31, 32, 33, 34, 35, 36, 37, 38, 39, or 40 wt %), the balance of impact resistance and fluidity is advantageously maintained.

Heat-Resistance SAN Copolymer

In the heat-resistant SAN copolymer of the present invention, it is possible to use a 3-membered copolymer or a 4-membered copolymer which is copolymerized by including one or two selected from an α-methyl styrene monomer and a phenyl maleimide monomer in a styrene monomer and a vinyl cyan-based monomer. It is possible to use a heat-resistant SAN copolymer with a weight average molecular weight (Mw) in a range of 80,000 to 120,000 (e.g., about 80,000, 90,000, 100,000, 105,000, 110,000, 115,000, or about 120,000). In order to include heat resistance required for automobile interior and exterior products, a 4-membered copolymer obtained by copolymerizing a styrene monomer, a vinyl cyan-based monomer, an α-methyl styrene monomer, and a phenyl maleimide monomer may be used. More preferably, a 4-membered copolymer obtained by copolymerizing about 5 wt % to about 10 wt % (e.g., about 5 wt %, 6, 7, 8, 9, or about 10 wt %) of a styrene monomer, about 15 wt % to about 25 wt % (e.g., about 15 wt %, 16, 17, 18, 19, 20, 21, 22, 23, 24, or about 25 wt %) of a vinyl cyan-based monomer, 40 to 50 wt % (e.g., about 40 wt %, 41, 42, 43, 44, 45, 46, 47, 48, 49, or about 50 wt %) of an α-methyl styrene monomer, and about 15 wt % to about 25 wt % (e.g., about 15 wt %, 16, 17, 18, 19, 20, 21, 22, 23, 24, or about 25 wt %) of a phenyl maleimide monomer is used as the heat-resistant SAN copolymer. The 3-membered copolymer or 4-membered copolymer may be prepared with reference to a publicly known polymerization method [Korean Patent Nos. 10-0922700 and 10-0915114].

In the low gloss ASA-based resin composition of the present invention, the heat-resistant SAN copolymer may be included in a range of about 10 wt % to about 40 wt % (e.g., about 10 wt %, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %). Preferably, when the SAN copolymer is included in a range of from about 20 wt % to about 30 wt % (e.g., about 20 wt %, 21, 22, 23, 24, 25, 26, 27, 28, 29, or about 30 wt %), the balance of impact resistance, fluidity, and heat resistance is advantageously maintained.

Crosslinked Aromatic Vinyl Compound-Cyanide Vinyl Compound Copolymer

A crosslinked aromatic vinyl compound-cyanide vinyl compound copolymer of the present invention is used for the purpose of implementing low gloss characteristics. The total crosslinking degree of the crosslinked aromatic vinyl compound-cyanide vinyl compound copolymer is from about 30 wt % to about 70 wt % (e.g., about 30 wt %, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, or about 70 wt %), preferably from about 40 wt % to about 65 wt % (e.g., about 40 wt %, 41, 42, 43, 45, 46, 47, 48, 49, 50, 51, 52, 53, 54, 55, 56, 57, 58, 59, 60, 61, 62, 63, 64, or about 65 wt %). When the crosslinking degree is less than 30 wt % or more than 70 wt %, the crosslinking degree may not serve to decrease the degree of gloss of the resin composition, and the occurrence of microgels in the processing procedure may cause an appearance defect problem.

As the aromatic vinyl compound constituting the crosslinked aromatic vinyl compound-cyanide vinyl compound copolymer, it is possible to use one or a mixture of two or more selected from styrene; a branch-chained alkyl-substituted styrene such as α-methyl styrene and α-ethyl styrene; an alkyl-substituted styrene such as p-methyl styrene and o-t-butyl styrene; a halo atom-substituted styrene such as bromo styrene, chloro styrene, and trichloro styrene, and the like, and the aromatic vinyl compound is not always limited thereto. The aromatic vinyl compound is preferably styrene.

As the cyanide vinyl compound constituting the crosslinked aromatic vinyl compound-cyanide vinyl compound copolymer, it is possible to use one or a mixture of two or more selected from acrylonitrile, methacrylonitrile, and the like, and the cyanide vinyl compound is not always limited thereto.

As a crosslinking agent for preparing the crosslinked aromatic vinyl compound-cyanide vinyl compound copolymer, divinylbenzene, trivinylbenzene, and trialkyl isocyanurate may be used. Further, it is possible to use a methacrylate-based monomer having two or more double bonds such as allyl methacrylate and ethylene glycol dimethacrylate.

The crosslinked vinyl compound-cyanide vinyl compound copolymer may be commercially purchased and used. For example, a product may be purchased from Han Nanotech Co., Ltd., Korea, and as a preferred Example, an AM-7 grade product may be used.

In the low gloss ASA-based resin composition of the present invention, the crosslinked aromatic vinyl compound-cyanide vinyl compound copolymer may be included in a range of about 1 wt % to about 10 wt % (e.g., about 1 wt %, 2, 3, 4, 5, 6, 7, 8, 9, or about 10 wt %). Preferably, when the crosslinked aromatic vinyl compound-cyanide vinyl compound copolymer is included in a range of 1 to 5 wt % (e.g., about 1 wt %, 2, 3, 4, or about 5 wt %), the balance of impact resistance, fluidity, and low gloss property is advantageously maintained.

Amorphous Inorganic Material

An amorphous inorganic material used in the present invention is an amorphous inorganic material having an indefinite shape. Without being theoretically limited, but the amorphous inorganic material exhibits an effect of reducing the gloss by being scattered with the extra-large diameter ASA graft copolymer in the resin to scatter light.

The amorphous inorganic material is preferably an inorganic material with an average particle diameter of approximately from about 1 μm to about 10 μm (e.g., about 1 μm, 2, 3, 4, 5, 6, 7, 8, 9, or about 10 μm), and for example, it is possible to use one or a mixture of two or more selected from calcium carbonate, clay, talc, mica, quicklime (calcium oxide), and sepiolite, and the amorphous inorganic material is not always limited thereto. The amorphous inorganic material is preferably talc.

In the low gloss ASA-based resin composition of the present invention, the amorphous inorganic material may be included in a range of from about 0.1 wt % to about 5 wt %, (e.g., about 0.1 wt %, 0.2, 0.3 0.4, 0.5, 0.6, 0.7, 0.8, 0.9, 1.0, 1.1, 1.2, 1.3, 1.4, 1.5, 1.6, 1.7, 1.8, 1.9, 2, 2.2, 2.4, 2.6, 2.8, 3, 3.2, 3.4, 3.6, 3.8, 4, 4.2, 4.4, 4.6, 4.8 or about 5 wt %) preferably about 0.1 wt % to about 2 wt % (e.g., about 0.1, 0.2, 0.3 0.4, 0.5, 0.6, 0.7, 0.8, 0.9, 1.0, 1.1, 1.2, 1.3, 1.4, 1.5, 1.6, 1.7, 1.8, 1.9, or about 2 wt %). When the content of the amorphous inorganic material is less than 0.1 wt %, the effect of reducing the gloss is not sufficiently exhibited, and it is difficult to reduce the partial gloss deviation of the molded article. In contrast, when the content of the amorphous inorganic material is more than 5 wt %, the low gloss effect is excellent, but impact resistance and fluidity are exhibited at a very low level, and there occurs a problem in that the specific weight is extremely increased.

Other Additives

A typical additive in addition to the components may be added to the low gloss ASA-based resin composition of the present invention. For example, it is possible to add an additive such as a dye, a pigment, an antimicrobial agent, a lubricant, a heat stabilizer, an antioxidant, a release agent, a light stabilizer, an inorganic material additive, a UV absorber, a UV blocking agent, a flame retardant, a filler, a nucleating agent, an antistatic agent, a blowing agent, and a plasticizer, and these additives may be added either alone or in mixture of two or more. The typical additive may be included in a range of from about 0.01 wt % to about 5 wt % (e.g., about 0.01 wt %, 0.05, 0.1, 0.2, 0.3, 0.4, 0.5, 0.6, 0.7, 0.8, 0.9, 1, 1.2, 1.4, 1.6, 1.8, 2, 2.2, 0.24, 2.6, 2.8, 3, 3.2, 3.4, 3.6, 3.8, 4, 4.2, 4.4, 4.6, 4.8, or about 5 wt %) in the low gloss ASA-based resin composition. When the content of the typical additive is less than 0.01 wt %, there may occur discoloration and kneading problems in the processing procedure due to the lack of heat stability, and when the content is more than 5 wt %, there may occur a problem such as gas generation due to the thermal decomposition and volatilization of the additive.

Hereinafter, the configuration and action of the present invention will be described in more detail through preferred examples of the present invention. However, the following Examples are provided for exemplifying the present invention, and it should be noted that it is not interpreted as limiting the scope of the present invention in any case.

EXAMPLES

The following examples illustrate the invention and are not intended to limit the same.

Examples 1 to 5 and Comparative Examples 1 to 4
Preparation of Low Gloss Thermoplastic Resin Composition The mixing is performed by using the composition components and content ratios shown in the following Table 1, and test specimens were manufactured by using a twin extruder at 250° C. to perform an injection molding. The specification of each component used in the following Examples and Comparative Examples is as follows.

Large Diameter Graft Copolymer

ASA graft copolymer including a large diameter acrylic-based rubber core with an average particle diameter of 3,500 to 4,000 Å and having an acrylic-based rubber core content of 60 wt %

ABS graft copolymer including a large diameter butadiene-based rubber core with an average particle diameter of 3,000 to 4,000 Å and having a butadiene-based rubber core content of 6 wt %

Extra-Large Diameter Graft Copolymer

ASA graft copolymer including a large diameter acrylic-based rubber core with an average particle diameter of 0.5 to 1.0 μm and having an acrylic-based rubber core content of 60 wt %

ABS graft copolymer including an extra-large diameter butadiene-based rubber core with an average particle diameter of 2.5 to 3.0 μm and having a butadiene-based rubber content of 13.5 wt % (MA221 manufactured by LG Chem. Co., Ltd., bulk polymer)

SAN Copolymer membered SAN copolymer with a weight average molecular weight of 180,000, including 72 wt % of a styrene monomer and 28 wt % of acrylonitrile Heat-Resistance SAN Copolymer 4-membered SAN copolymer with a weight average molecular weight of 100,000, including 15 wt % of a styrene monomer, 25 wt % of a vinyl cyan-based monomer, 40 wt % of α-methyl styrene, and 20 wt % of phenyl maleimide Crosslinked Aromatic Vinyl Compound-Cyanide Vinyl Compound Copolymer An AM-7 product having a crosslinking degree of 50 wt %, manufactured by Han Nanotech Co., Ltd.

Amorphous Inorganic Material

Talc with an average particle diameter of 4 μm, a KCM-6300 product manufactured by Kochone Co., Ltd.

Other Additives

Lubricant: ethylene bis stearamide

Antioxidant: SN 147BF manufactured by Songwon Industrial Co., Ltd.

TABLE 1

| Classification | | Example (wt %) | | | | | Comparative Example (wt %) | | | |
|---|---|---|---|---|---|---|---|---|---|---|
| | | 1 | 2 | 3 | 4 | 5 | 1 | 2 | 3 | 4 |
| Large diameter graft copolymer | ASA-based[a-1] | 33 | 33 | 33 | 33 | 33 | 33 | 33 | 33 | 0 |
| | ABS-based[a-2] | 0 | 0 | 0 | 0 | 0 | 0 | 0 | 0 | 33 |
| Extra-large diameter graft copolymer | ASA-based[b-1] | 3 | 5 | 7 | 7 | 7 | 0 | 7 | 7 | 0 |
| | ABS-based[b-2] | 0 | 0 | 0 | 0 | 0 | 0 | 0 | 0 | 7 |
| SAN | General[c] | 39.5 | 37.5 | 31.5 | 32 | 23 | 39 | 35 | 34 | 32 |
| | Heat-resistant[d] | 20 | 20 | 20 | 20 | 30 | 20 | 20 | 20 | 20 |
| Crosslinked aromatic vinyl compound-cyanide vinyl compound copolymer[e] | | 1 | 1 | 5 | 3 | 3 | 3 | 0 | 3 | 3 |
| Amorphous inorganic material[f] | | 0.5 | 0.5 | 0.5 | 2 | 1 | 2 | 2 | 0 | 2 |
| Additive | Lubricant | 1.5 | 1.5 | 1.5 | 1.5 | 1.5 | 1.5 | 1.5 | 1.5 | 1.5 |
| | Antioxidant | 1.5 | 1.5 | 1.5 | 1.5 | 1.5 | 1.5 | 1.5 | 1.5 | 1.5 |
| Sum (wt %) | | 100 | 100 | 100 | 100 | 100 | 100 | 100 | 100 | 100 |

Experimental Example. Measurement of Physical Properties of Thermoplastic Resin Composition Test Specimen For each test specimen manufactured in Examples 1 to 5 and Comparative Examples 1 to 4, physical properties were measured in accordance with the following physical property evaluation method.

Izod impact strength: was measured in accordance with the ASTM D256.

Flow index: was measured under a condition of 220° C. and 10 kg in accordance with the ASTM D1238.

Tensile strength: was measured in accordance with the ASTM D638.

Heat resistance (HDT): was measured in accordance with the ASTM D648.

Gloss measurement: was performed in accordance with the ASTM D523.

Gloss deviation: was measured in accordance with the ASTM D523. In a test specimen extruded from the mold in FIG. 1, the surface gloss deviations were measured in 10 regions, and the difference between the maximum value and the minimum value was calculated as ΔGloss.

Weatherability: was evaluated as ΔE in accordance with the SAE J2527.

$$\Delta E = \sqrt{\{(L-L')^2 + (a-a')^2 + (b-b')^2\}}$$

(L, a, and b are color values of the test specimen before the weatherability test, and L', a', and b' are color values of the test specimen after the weatherability test)

TABLE 2

| Classification | Example | | | | | Comparative Example | | | |
|---|---|---|---|---|---|---|---|---|---|
| | 1 | 2 | 3 | 4 | 5 | 1 | 2 | 3 | 4 |
| Impact strength (kgfcm/cm) | 15 | 20 | 18 | 16 | 15 | 11 | 18 | 18 | 25 |
| Flow index (g/10 min) | 10 | 8 | 5 | 6 | 4 | 8 | 10 | 7 | 10 |
| Tensile strength (kgf/cm$^2$) | 480 | 450 | 460 | 470 | 480 | 490 | 450 | 460 | 480 |
| HDT (1.8 Mpa, ° C.) | 96 | 96 | 95 | 95 | 98 | 97 | 95 | 95 | 95 |
| Gloss (60°) | 27 | 24 | 15 | 20 | 18 | 48 | 67 | 52 | 30 |
| Gloss deviation (60°) | 4 | 3 | 3 | 2 | 2 | 9 | 15 | 8 | 8 |
| Weatherability Δ E | 2.1 | 2.2 | 2.2 | 2.1 | 2.2 | 2.0 | 2.1 | 2.3 | 5.1 |

From the result of Table 2, it can be seen that when a general SAN copolymer, a heat-resistant SAN copolymer, a crosslinked aromatic vinyl compound-cyanide vinyl compound copolymer, and an amorphous inorganic material were blended and used with large diameter and extra-large diameter ASA graft copolymers at a predetermined composition ratio as proposed by the present invention, impact resistance, heat resistance, flowability, weatherability, and low gloss characteristics were all excellent, and particularly, the entire gloss deviation was significantly reduced. Therefore, the resin compositions in Examples 1 to 5 are useful as a material for an injection molded article having excellent appearance quality due to uniform gloss characteristics.

In contrast, it was confirmed that in Comparative Example 1, the impact strength and low gloss characteristics were poor, and the gloss deviation was also large as a test specimen of the resin composition which does not include the extra-large diameter ASA graft copolymer. In Comparative Examples 2 and 3, as a test specimen of the resin composition which does not include the crosslinked aromatic vinyl compound-cyanide vinyl compound copolymer or the amorphous inorganic material, impact resistance, heat resistance, flowability, and weatherability were excellent, but there was no effect of improving the appearance quality of the injection molded article because the low gloss characteristics were poor and the gloss deviation was large. In Comparative Example 4, it can be confirmed that as a test specimen of the resin composition which includes small particle diameter and large particle diameter ABS graft copolymers, the weatherability was poor and the gloss deviation was large as expected.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A low gloss ASA-based resin composition comprising:
   (a) about 10 wt % to 40 wt % of an ASA graft copolymer comprising a large diameter acrylic rubber with an average particle diameter of about 3,000 to 5,000 Å as a core;
   (b) about 1 wt % to 20 wt % of an ASA graft copolymer comprising an extra-large diameter acrylic-based rubber with an average particle diameter of about 0.5 μm to 1.5 μm as a core;
   (c) about 20 wt % to 60 wt % of an SAN copolymer;
   (d) about 10 wt % to 40 wt % of a heat-resistant SAN copolymer;
   (e) about 1 wt % to 10 wt % of a crosslinked aromatic vinyl compound-cyanide vinyl compound copolymer; and
   (f) about 0.1 wt % to 5 wt % of an amorphous inorganic material.

2. The low gloss ASA-based resin composition of claim 1, wherein (a) the large diameter ASA graft copolymer or (b) the extra-large diameter ASA graft copolymer is prepared by an emulsion polymerization method, and comprises an acrylic-based rubber as a core, and a vinyl-based monomer is graft-polymerized on the surface of the core to form a shell.

3. The low gloss ASA-based resin composition of claim 1, wherein (a) the large diameter ASA graft copolymer or (b) the extra-large diameter ASA graft copolymer has an acrylic-based rubber core content of about 30 wt % to 80 wt % and a vinyl-based graft copolymer shell content of about 20 wt % to 70 wt %.

4. The low gloss ASA-based resin composition of claim 1, wherein (c) the SAN copolymer is a 2-membered copolymer obtained by copolymerizing about 50 wt % to 90 wt % of an aromatic vinyl-based monomer and about 10 wt % to 50 wt % of a cyanide vinyl-based monomer.

5. The low gloss ASA-based resin composition of claim 1, wherein (d) the heat-resistant SAN copolymer is a 4-membered copolymer obtained by copolymerizing about 5 wt % to 10 wt % of a styrene monomer, about 15 wt % to 25 wt % of a vinyl cyan-based monomer, about 40 wt % to 50 wt % of an α-methyl styrene monomer, and about 15 wt % to 25 wt % of a phenyl maleimide monomer.

6. The low gloss ASA-based resin composition of claim 1, wherein (e) the crosslinked aromatic vinyl compound-cyanide vinyl compound copolymer has a crosslinking degree of about 30 wt % to 70 wt %.

7. The low gloss ASA-based resin composition of claim 1, wherein (f) the amorphous inorganic material is a talc with an average particle diameter of about 1 µm to 10 µm.

8. The low gloss ASA-based resin composition of claim 1, further comprising a lubricant and an antioxidant.

9. A molded article manufactured by injection molding the low gloss ASA-based resin composition of claim 1.

* * * * *